US012225644B2

(12) United States Patent
Li et al.

(10) Patent No.: US 12,225,644 B2
(45) Date of Patent: Feb. 11, 2025

(54) FLYING FIREFLY LAMP LINEARLY DISTRIBUTED

(71) Applicant: Jiawei Renewable Energy Co., Ltd., Guangdong (CN)

(72) Inventors: Liang Li, Guangdong (CN); Guoqiang Chen, Guangdong (CN)

(73) Assignee: Jiawei Renewable Energy Co., Ltd., Guangdong (CN)

( * ) Notice: Subject to any disclaimer, the term of this patent is extended or adjusted under 35 U.S.C. 154(b) by 0 days.

(21) Appl. No.: 17/639,448

(22) PCT Filed: Nov. 8, 2021

(86) PCT No.: PCT/CN2021/129344

§ 371 (c)(1),
(2) Date: Mar. 30, 2023

(87) PCT Pub. No.: WO2023/045045

PCT Pub. Date: Mar. 30, 2023

(65) Prior Publication Data

US 2024/0114607 A1 Apr. 4, 2024

(30) Foreign Application Priority Data

Sep. 27, 2021 (CN) ........................ 202122360243.4

(51) Int. Cl.
*H05B 45/30* (2020.01)
*F21S 4/00* (2016.01)
(Continued)

(52) U.S. Cl.
CPC .............. *H05B 45/325* (2020.01); *F21S 4/10* (2016.01); *F21S 9/035* (2013.01); *F21V 19/001* (2013.01);
(Continued)

(58) Field of Classification Search
CPC ...... H05B 45/10; H05B 45/30; H05B 45/325; H05B 47/10; H05B 47/105; H05B 47/155;
(Continued)

(56) References Cited

U.S. PATENT DOCUMENTS

2004/0177536 A1 9/2004 Carter

FOREIGN PATENT DOCUMENTS

| | | | | |
|---|---|---|---|---|
| CN | 111556602 A | | 8/2020 | |
| JP | 2004286860 A | | 10/2004 | |
| WO | WO-2015196894 A1 | * | 12/2015 | ............ H05B 37/02 |

* cited by examiner

*Primary Examiner* — Jimmy T Vu
(74) *Attorney, Agent, or Firm* — Nath, Goldberg & Meyer; Joshua B. Goldberg

(57) ABSTRACT

The present application provides a flying firefly lamp linearly distributed, which includes at least one imitated firefly unit and a power cord; the power cord includes a positive power cord and a negative power cord, and the at least one imitated firefly unit is sequentially connected in parallel between the positive power cord and the negative power cord; the imitated firefly unit includes a PCB board (101), the PCB board is provided with an attitude control chip and a plurality of LED lights arranged in an arrangement, after the attitude control chip is energized by the power cord, the attitude control chip controls the plurality of LED lights to flash in sequence according to a preset flying mode.

17 Claims, 3 Drawing Sheets

(51) Int. Cl.

| | |
|---|---|
| ***F21S 4/10*** | (2016.01) |
| ***F21S 9/03*** | (2006.01) |
| ***F21V 19/00*** | (2006.01) |
| ***H05B 45/325*** | (2020.01) |
| ***H05B 45/54*** | (2020.01) |
| ***H05B 47/10*** | (2020.01) |
| ***H05B 47/105*** | (2020.01) |
| ***H05B 47/155*** | (2020.01) |
| *F21Y 113/00* | (2016.01) |
| *F21Y 115/10* | (2016.01) |

(52) U.S. Cl.
CPC ........... *H05B 45/54* (2020.01); *H05B 47/105* (2020.01); *H05B 47/155* (2020.01); *F21Y 2113/00* (2013.01); *F21Y 2115/10* (2016.08)

(58) Field of Classification Search
CPC ........... F21S 4/10; F21S 9/035; F21V 19/001; F21Y 2113/00; F21Y 2115/10
See application file for complete search history.

(a)

(b)

FLYING FIREFLY LAMP LINEARLY DISTRIBUTED

CROSS REFERENCE TO RELATED APPLICATION

The present application is a National Stage Appl. filed under 35 USC 371 of International Patent Application No. PCT/CN2021/129344 with an international filing date of Nov. 8, 2021, designating the USA, now pending, and further claims priority of Chinese patent application, with application No. 202122360243.4, filed on Sep. 27, 2021 to CNIPA, the entire content of which is incorporated herein by reference.

TECHNICAL FIELD

The present application relates to the field of electronic technique, and more particularly to a flying firefly lamp linearly distributed.

BACKGROUND

With the continuous improvement of the level of technology and the yearning for romantic life, people have higher and higher requirements for decorative lamps. Firefly lamps have been widely used in parks, scenic spots, urban greening, courtyards and other places because they can create a romantic atmosphere of summer fireflies. By controlling the on and off of the LED lights, the firefly lamp simulates the light-emitting rhythm and flashing cycle of the firefly, thereby playing a decorative role. However, the function of the existing firefly lamp is relatively single, and it can only simulate the state of the firefly flashing or always on at a fixed position at night, and cannot achieve the visual effect of the firefly flying naturally in the air.

Technical Problem

The present application provides a flying firefly lamp linearly distributed, which can solve the technical problem that the existing firefly lamp cannot achieve the visual effect of the firefly flying naturally in the air.

SUMMARY

The embodiment of the present application provides a flying firefly lamp linearly distributed, which includes at least one imitated firefly unit and a power cord; the power cord includes a positive power cord and a negative power cord, and the at least one imitated firefly unit is sequentially connected in parallel between the positive power cord and the negative power cord; the imitated firefly unit includes a PCB board (101), the PCB board is provided with an attitude control chip and a plurality of LED lights arranged in an arrangement, after the attitude control chip is energized by the power cord, the attitude control chip controls the plurality of LED lights to flash in sequence according to a preset flying mode.

Based on the flying firefly lamp linearly distributed provided by the present application, the PCB board, the attitude control chip arranged on the PCB board, and the plurality of LED lights composed of one imitated firefly unit, because each imitated firefly unit has a simple structure and low power consumption, such that multiple imitated firefly units can be unlimited expansion between the positive power cord and the negative power cord. The positive power cord and the negative power cord are respectively connected to the PCB board in each imitated firefly unit, such that the multiple imitated firefly units can be connected in parallel between the positive power cord and the negative power cord, thereby forming a firefly lamp linearly distributed. After the power cord is energized, each attitude control chip can control the corresponding plurality of LED lights to flash in sequence according to a certain rule according to the preset flying mode, so that each imitated firefly unit can simulate the dynamic and natural visual effect of a firefly flying in the air.

Optionally, the attitude control chip is an MCU, and the MCU is stored with serial number of each imitated firefly unit and a time-scale configured for controlling each imitated firefly unit to flash according to the flying mode.

Based on the above optional manner, the MCU has a certain driving capability. After the power cord is energized, the LED lights can be directly driven by the MCU, without other driving components, so that the number of components of the flying firefly lamp can be reduced, and the cost can be saved. In addition, each imitated firefly unit has its own series number, and each imitated firefly unit can implement the corresponding flying mode according to the time-scale where its own series number is located according to the time-scale stored in the attitude control chip to control the working status of each imitated firefly unit. Every time a new imitated firefly unit is added between the positive power cord and the negative power cord, which can find the time to control the new imitated firefly unit to realize the flying mode in the time-scale according to the corresponding series number, so that the flying states of the multiple imitated firefly units can be better coordinated.

Optionally, the PCB board is further provided with a current-limiting resistor, and one end of the current-limiting resistor is respectively connected to the positive power cord and the attitude control chip, and the other end is respectively connected to the plurality of LED lights. The current-limiting resistor is used to prevent the LED lights from being burnt out due to excessive current when the power cord is energized, and to protect the LED lights.

Optionally, the flying firefly lamp further includes an invisible bracket and a lampshade; each imitated firefly unit and the power cord are arranged on the invisible bracket, the invisible bracket is arranged in the lampshade, the lampshade is provided with a plurality of through holes, and inside of the lampshade is plated with a matte coating, and an outer surface of the power cord is provided with a matte sheath; a color of the matte coating, a color of the PCB board, and a color of the outer surface of the invisible bracket are the same as a color of the matte sheath, and light emitted by the plurality of LED lights are emitted through the through holes.

Based on the above optional manner, the outer surface of the power cord, the color of the PCB board, the outer surface of the invisible bracket and the inside of the lampshade are provided with the same color, and they are all matte colors, and the color is softer. The imitated firefly units and the power cord are arranged on the invisible bracket in the manner of wounding, etc., and at the same time, the invisible bracket is arranged inside the lampshade, the light emitted by the LED lights can be emitted through multiple through holes on the lampshade, and the concealment of the power cord can be improved at the same time.

Optionally, the color of the matte coating, the color of the PCB board (101), the color of the outer surface of the invisible bracket, and the color of the matte sheath are black. Generally, the flying firefly lamp linearly distributed is turned on at night, and the black is more concealed, and it is not easy to detect by the human eye.

Optionally, the invisible bracket is a spring.

Optionally, a shape of the PCB board is in a leaf shape, and a color of the PCB board is the same as a color of the leaf. When the flying firefly lamp linearly distributed is wrapped in the flowers and trees in the courtyard, the PCB board can be better hidden in the flowers and trees under the shade of the leaves, and it is not easy to be detected by the human eye, which can achieve the visual effect of the flying fireflies, and can also shield the power cord to a certain extent.

Optionally, the flying firefly lamp further includes a power supply unit, and the power supply unit is connected to the imitated firefly units through the power cord, and the power supply unit is configured for powering the imitated firefly units.

Optionally, the power supply unit is a solar power supply unit.

The structure of the present application and the other application purposes and beneficial effects thereof will be more obvious and understandable in the description of the preferred embodiments in conjunction with the accompanying drawings.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
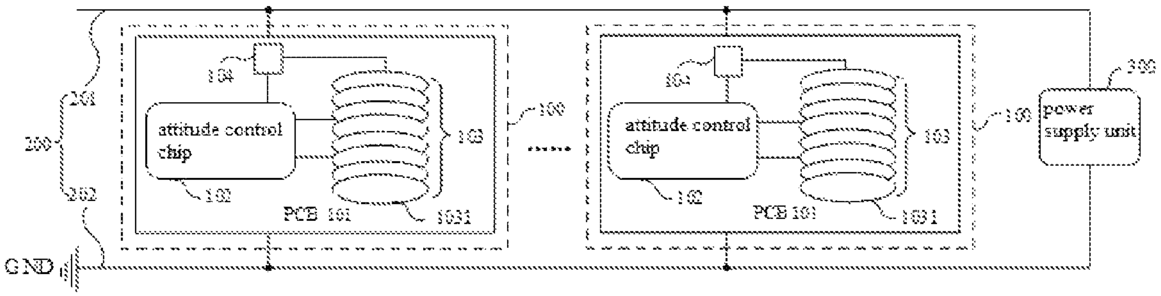
FIG. 1 is a schematic structural view of a flying firefly lamp linearly distributed provided by an embodiment of the present application.

In the drawings, the reference signs are listed:

100—imitated firefly unit; 101—PCB board; 102—attitude control chip; 103—LED light group; 1031—LED light; 104—current-limiting resistor; 200—power cord; 201—positive power cord; 202—negative power cord; 300—power supply unit.

DETAILED DESCRIPTION

In order to make the purpose, technical features and advantages of the present application be more obvious and more understandable, technical solutions in the embodiments of the present application will be described clearly and comprehensively with reference to accompanying drawings in the embodiments, it is obvious that, the embodiments described below are merely part of the embodiments of the present application, but not the whole of the embodiments. Based on the embodiments in the present application, some other embodiments, which are obtained by one of ordinary skill in the art at the premise of paying no creative labor, are all included in the protection scope of the present application.

Firefly lamps have been widely used in parks, scenic spots, urban greening, courtyards and other places because they can create a romantic atmosphere of summer fireflies. In the prior art, by controlling the on and off of the LED lights, the firefly lamp simulates the light-emitting rhythm and flashing cycle of the firefly, thereby playing a decorative role. However, the function of the existing firefly lamp is relatively single, and it can only simulate the state of the firefly flashing or always on at a fixed position at night, and cannot achieve the visual effect of the fireflies flying in the air in natural.

In order to solve the above technical problem, the embodiment of the present application provides a flying firefly lamp linearly distributed. The attitude control chip and the LED light group are arranged on the PCB board to reduce the number of control lines and hardware and save costs. The attitude control chip can control plurality of LED lights in the LED light group to flash alternately in a certain rule through the PCB board according to the preset flying mode, the visual effect of fireflies flying dynamically in the air in natural scenes is realized.

The technical solution of the present application will be described in detail below with reference to the accompanying drawings. The embodiments described below with reference to the drawings are exemplary, and are intended to explain the present application, but should not be understood as a limitation to the present application.

Referring to FIG. 1, which shows a schematic structural view of a flying firefly lamp linearly distributed. In a possible implementation manner, the flying firefly lamp linearly distributed provided in the present application includes a power cord 200 and at least one imitated firefly unit 100. Each imitated firefly unit 100 includes a Printed Circuit Board (PCB) 101, an attitude control chip 102 and an LED light group 103. The LED light group 103 includes a plurality of LED lights 1031. The power supply cord 200 includes a positive power supply cord 201 and a negative power supply cord 202.

Figure 2:
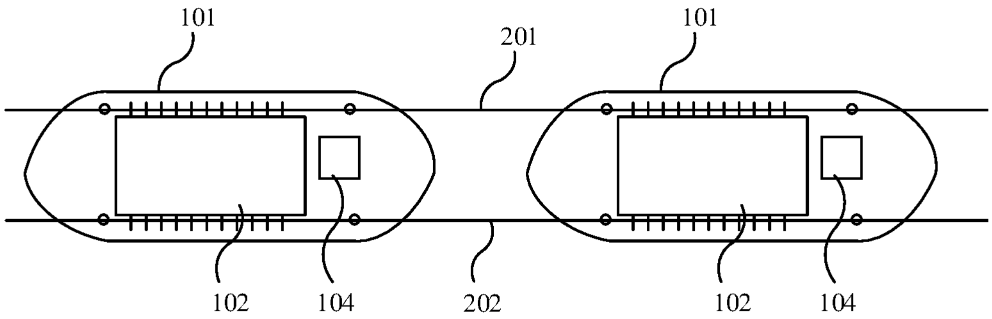
FIG. 2 is a schematic structural view of an imitated firefly unit provided by an embodiment of the present application.
Figure 2:
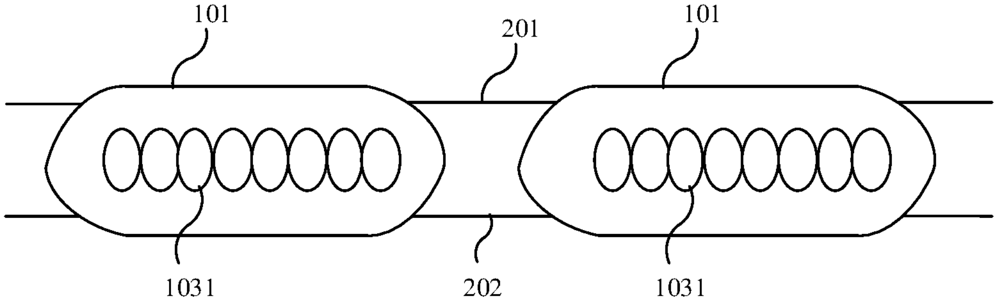

Referring to FIG. 2, which shows a schematic structural view of an imitated firefly unit 100. Exemplarily, FIG. 2 includes two imitated firefly units 100, and (a) in FIG. 2 is a front structural view of the imitated firefly unit 100, and (b) in FIG. 2 is a rear structural view of the imitated firefly unit 100. Specifically, the positive power cord 201 and the negative power cord 202 are respectively welded on the PCB boards 101 of the two imitated firefly units 100 in sequence, and the negative power cord 202 (ie, the ground wire) is grounded. For each imitated firefly unit 100, the attitude control chip 102 is arranged on the PCB board 101, and the plurality of LED lights 1031 in the LED light group 103 are arranged on the PCB board 101. After the power cord 200 is energized, the attitude control chip 102 can control the plurality of LED lights 1031 in the LED light group 103 to flash in sequence according to the preset flying mode.

The imitated firefly unit 100 in the flying firefly lamp linearly distributed provided in the present application can be provided with one or more. As shown in FIG. 1, when a plurality of imitated firefly units 100 are provided in the flying firefly lamp linearly distributed, the positive power cord 201 and the negative power cord 202 are respectively welded to the PCB board 101 in each imitated firefly unit 100 in sequence. Then the plurality of imitated firefly units 100 are connected in parallel between the positive power cord 201 and the negative power cord 202 in sequence. The power supply unit 300 can provide power to each imitated firefly unit 100 through the power cord 200.

It should be noted that, since the power consumption of each imitated firefly unit 100 is relatively small, exemplarily, the power consumption of each imitated firefly unit 100 is within 5 mA. Therefore, in the flying firefly lamp linearly distributed provided by the present application, a larger number of imitated firefly units 100 can be arranged between the positive power cord 201 and the negative power cord 202, and the power supply of each imitated firefly unit 100 will not be affected by the large number of loads. For example, the imitated firefly units can be provided with 100 in parallel between the positive power cord 201 and the negative power cord 202 in sequence.

In one embodiment, for each imitated firefly unit 100, the PCB board 101 of the imitated firefly unit 100 is further provided with a current-limiting resistor 104, one end of the current-limiting resistor 104 is respectively connected to the positive power cord 201 and the attitude control chip 102, and the other end is respectively connected to the plurality of LED lights 1031 in the imitated firefly unit 100. The current-limiting resistor 104 is used to prevent the LED lights 1031 from burning out due to excessive current when the power cord 200 is energized, and can protect the LED lights 1031.

In an example, the attitude control chip 102 may be a Microcontroller Unit (MCU), also known as a single chip microcomputer or a single chip. The MCU is a programmable micro-control unit, so the plurality of LED lights 1031 in the corresponding LED light group 103 can be controlled by the software algorithm set inside the MCU to flash in sequence according to the preset flying mode, so that each imitated firefly unit 100 can simulate the visual effect of a firefly flying dynamically in the air. In addition, the MCU has a certain driving capability. After the power cord 200 is energized, the LED lights 1031 can be directly driven through the MCU, without other driving components. For each additional imitated firefly unit in the flying firefly lamp linearly distributed, only need to add one PCB board 101, and the MCU, LED light group 103 and current-limiting resistor 104 that are installed on the PCB board 101. The flying firefly lamp has a simple structure, the number of required components and control cords are less, saving costs.

In another example, each attitude control chip 102 is provided with an Electrically Erasable Programmable Read Only Memory (EEPROM). The EEPROM is used to store the serial numbers of the imitated firefly units 100. Each imitated firefly unit 100 is provided with a serial number, and the attitude control chip 102 stores a time-scale that controls the working state of each imitated firefly unit. Each imitated firefly unit 100 can be implemented the preset flying mode according to the time when the corresponding serial number is located in the time-scale. Every time a new imitated firefly unit 100 is added between the positive power cord 201 and the negative power cord 202, according to the corresponding serial number stored in the EEPROM of the attitude control chip 102 in the imitated firefly unit 100, the time at which it can control the newly added imitated firefly unit 100 to realize the preset flying mode can be found in the time-scale, so that the flying state of multiple imitated firefly units 100 can be better coordinated, and there will be no unbalanced coordination.

It should be noted that the PCB board 101 is a carrier for electrical interconnection between electronic components, and it can replace complex wiring to realize the circuit connection between the components in the circuit. In the embodiment of the present application, each LED light 1031 in the attitude control chip 102, the current-limiting resistor 104 and the LED light group 103 can be installed on the PCB board 101 by inserting, mounting, soldering, etc., to achieve the electrical connection between the attitude control chip 102, the current-limiting resistor 104 and the LED light group 103. It is not necessary to connect the attitude control chip 102 and the current-limiting resistor 104 to each LED light 1031 in the LED light group 103 through a control line, so that the number of control lines can be reduced.

In an embodiment, the power supply source of the flying firefly lamp linearly distributed provided in the present application may be mains. After AC/DC (Alternating Current/Direct Current) conversion is performed on the mains, the power supply can be 200 supplies power to each imitated firefly unit 100 in the flying firefly lamp linearly distributed.

In another embodiment, the flying firefly lamp linearly distributed provided in the present application further includes a power supply unit 300. The power supply unit 300 can supply power to each imitated firefly unit 100 through the power cord 200. As an example and not a limitation, the power supply unit 300 may be a solar power supply unit or a battery power supply unit. The power supply unit 300 may be provided with a solar power supply circuit or a battery power supply circuit, and a control switch. When the control switch is turned on, the power supply unit 300 can supply power to each imitated firefly unit 100 through the power cord 200.

It should be noted that the attitude control chip 102 in each firefly unit 100 can control the plurality of LED lights 1031 in the LED light group 103 to flash in sequence according to the preset flying mode through the PCB board 101 to simulate the flying mode of a firefly. The flying mode may refer to the plurality of LED lights 1031 in the at least one LED light group 103 in the linearly distributed flying firefly lights flashing according to preset rules to simulate the dynamic flying of fireflies, for example: breathing light flying and flowing, inciting wings to fly and dance, imitating staying in the same frequency communication, etc. Among them, the breathing light flying and flowing can cause changes in the position of the fireflies during the dynamic dancing process and accompanied by bright changes; inciting wings to fly and dance can be the change of the position of the fireflies during the dynamic dancing process but keeps the light constantly; imitating staying the same frequency communication can mean that if there are multiple LED light groups 103, one of the LED light groups 103 simulates a firefly flying for a period of time and then stays in a fixed position and flashes at a preset frequency, the other LED light groups 103 continue to dance for different time or same time and then stays in a fixed position and flashes at a preset frequency to simulate the communication between multiple fireflies. In addition, the attitude control chip 102 can provide a certain power drive for the corresponding LED light group 103, and can directly control the brightness and darkness of each LED light 1031 in the LED light group 103 and the speed of change, on and off, breathing frequency, breathing movement distance, movement speed, etc. through software algorithms, to simulate the different flying postures of fireflies.

Based on the above-mentioned embodiments, in order to make the firefly lamp linearly distributed provided in the present application better simulate the visual effect of fireflies in controlling the dynamic and natural flying, it is necessary to further improve the concealment of the firefly lamp linearly distributed.

In a possible implementation manner, the power cord 200 may be a copper cord or a silver cord, a transparent sheath is provided on the outer surface of the power cord 200, and the outer diameter of the power cord 200 is greater than 0 and less than or equal to 0.2 mm, where the outer diameter is the sum of the diameter of the power cord 200 and the diameter of the transparent sheath provided on the outer surface. The ultra-thin power cord 200 is small in size, not easily detectable by the human eye, and has better concealment. At the same time, the shape of each PCB board 101 can be arranged to be in a leaf shape, and the color of the outer surface of each PCB board 101 is the same as the color of the leaves or trunks. Exemplarily, when green paint is painted on the outer surface of the PCB board 101, and the flying firefly lamp linearly distributed is directly wound in the green flowers and trees of the courtyard, the green and leaf-shaped PCB board 101 can be better hidden in the flowers and trees, it is not easy to be noticed by the human eye. After the power cord 200 is energized, it can simulate the dynamic effect of fireflies flying in the sky among the flowers and grass.

In another possible implementation manner, the flying firefly lamp linearly distributed provided in the present embodiment further includes an invisible bracket and a lampshade. The imitated firefly units 100 and the power cord 200 are arranged on the invisible bracket, and the invisible bracket is arranged in the lampshade. The lampshade is provided with a plurality of through holes, which can be regarded as a hollow-out lampshade, and the inner side of the lampshade is plated with a matte coating. The outer surface of the power cord 200 is provided with a matte sheath. Among them, the color of the inner matte coating of the lampshade, the color of the PCB board 101, and the color of the outer surface of the invisible bracket are the same as the color of the matte sheath, and the light emitted by the plurality of LED lights in the LED light group 103 can pass through the through holes to be emitted. The outer surface of the power cord 200, the outer surface of the invisible bracket and the inner side of the lampshade are all arranged to be the same color, and are all matte colors, and the color is softer. The light illuminated on the power cord 200 and the invisible bracket does not reflect, the imitated firefly unit 100 and the power cord 200 are arranged on the invisible bracket in a manner such as winding, and the invisible bracket is arranged inside the lampshade, so that the power cord 200 is more concealed.

In one embodiment, the invisible bracket may be a spring with a small wire diameter. The imitated firefly units 100 and the power cord 200 can be wound around the spring, or can be threaded through the spring.

In another embodiment, the color of the matte coating, the color of the outer surface of the PCB board 101, the color of the outer surface of the invisible bracket, and the color of the matte sheath may all be black. Exemplarily, the matte coating may be matte paint. Based on the above embodiment, in the dark night, the black invisible bracket, the black power cord 200 and the black components on the PCB board 101 are not easily perceivable by human eyes, and the effect of being completely invisible can be achieved. Even in the daytime, when people are located 50 cm away from the flying firefly lamp linearly distributed, the invisible bracket inside the lampshade, the power cord 200 and the components on the PCB board 101 are not noticed.

In other possible implementation manners, if N imitated firefly units 100 are provided in the flying firefly lamp linearly distributed, and N is a positive integer greater than one. Then M LED light groups 103 in the imitated firefly units 100 include one LED light individually disposed, and M is a positive integer greater than 0 and less than N. The attitude control chip 102 can control the on and off of the LED light individually disposed, so that the LED lights flash at a certain frequency. The flying firefly lamp linearly distributed can simulate the effect of dynamic and natural flying of some fireflies in the air, while the other part of the fireflies can simulate the visual effect of flashing fluorescence when a firefly stays in a fixed position, the diversity of functions of the flying firefly lamp linearly distributed can be realized.

The flying firefly lamp linearly distributed provided in the present application has the following characteristics: (1) the number of components is small and the cost is low: the MCU has the ability to drive the LED light group 103, and without other driving components are required, each imitated firefly unit 100 can be controlled to implement the preset flying mode at the corresponding time according to its own series number, according to each MCU the stored time-scale and the series numbers stored in the EEPROM in the MCU, without other control devices. The MCU, plurality of LED lights 1031, and the current-limiting resistor 104 arranged on the PCB board 101 can form each imitated firefly unit 100, which has a simple structure. (2) The effect of dynamic and natural flying of fireflies can be realized: after the power cord 200 is energized, each attitude control chip 102 can control the corresponding plurality of LED lights 1031 according to the preset flying mode to flash in sequence according to a certain rule, so that each imitated firefly unit 100 can simulate the visual effect of a firefly flying dynamically in the air. (3) the number of imitated firefly units is easy to be expanded: the power consumption of each imitated firefly unit 100 is less, so that unlimited number of imitated firefly units 100 can be arranged between the positive power cord 201 and the negative power cord 202. In addition, every time a new imitated firefly unit 100 is added, after the power cord 200 is energized, which can find the time to control the new imitated firefly unit 100 to realize the flying mode in the time-scale according to its own series number, so that the flying states of the multiple imitated firefly units 100 can be better coordinated. (4) Invisible effect: the imitated firefly units 100 and the power cord 200 are arranged in the hollow-out lampshade through the invisible bracket, and the colors of which are arranged to be black to achieve the invisible effect. Alternatively, the PCB board 101 with green leaf-shaped and the transparent power cord 200 are wound around the flowers and grass to achieve the invisible effect.

Figure 3:
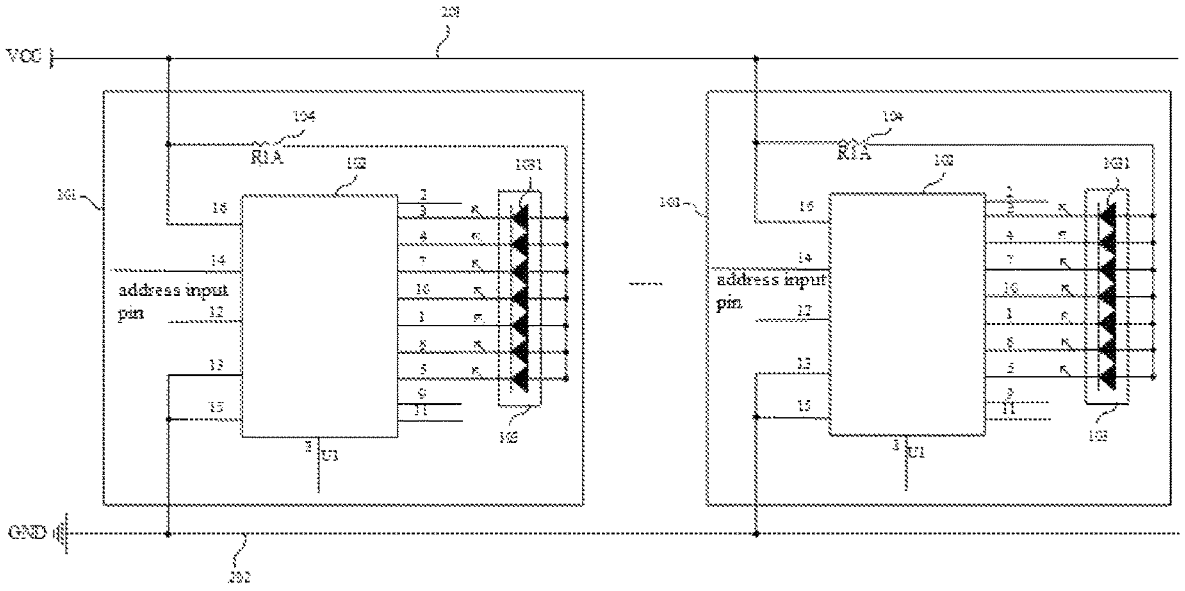
FIG. 3 is a schematic view of a flying firefly lamp linearly distributed provided by an embodiment of the present application.
Figure 4:
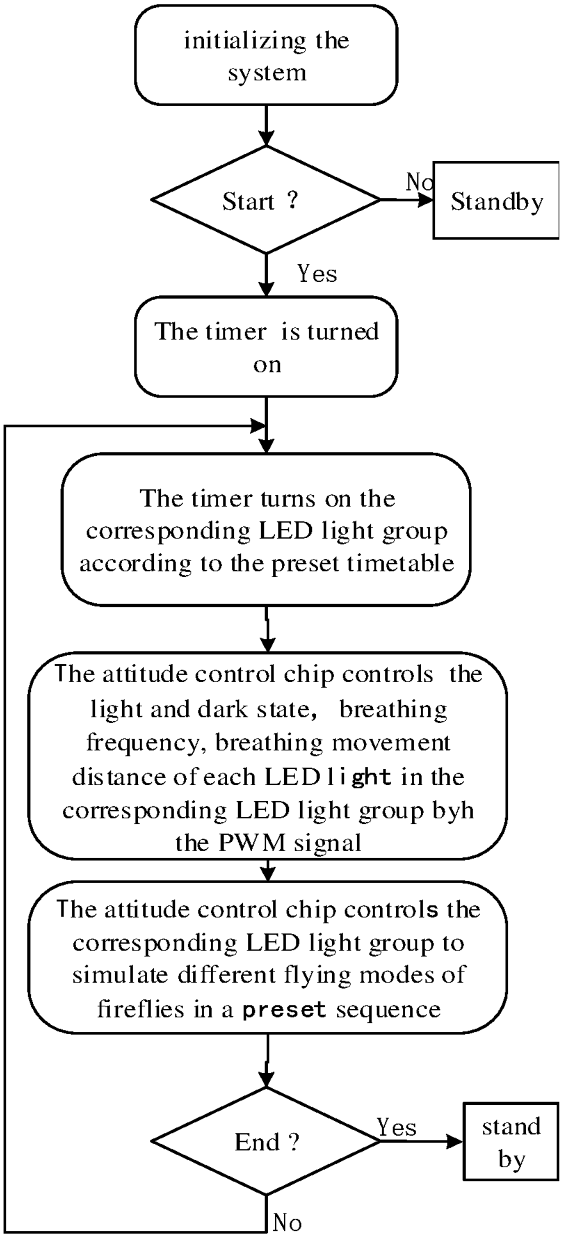
FIG. 4 is a flowchart of a method for controlling a flying firefly lamp linearly distributed according to an embodiment of the present application.

FIG. 3 is a schematic diagram of the flying firefly lamp linearly distributed provided by an embodiment of the present application. The attitude control chip 102 (ie, MCU) includes a plurality of pins (ie, Pin1-Pin16). The Pin16 is the power input terminal, which is connected to the power supply unit 300, the Pin13 and Pin15 are grounded, and the Pin14 is the address input pin. The principle diagram shown in FIG. 3 includes two imitated firefly units 100.

Specifically, the positive power cord 201 and the negative power cord 202 are respectively welded on the PCB board 101 in the two imitated firefly units 100 in sequence, that is, the two imitated firefly units 100 are connected in parallel between the positive power cord 201 and the negative power cord 202, the positive power cord 201 is connected to the power supply unit 300, and the negative power cord 202 is grounded. The two attitude control chips 102 are respectively connected to the power supply unit 300 through a load R1A. For each imitated firefly unit 100, each pin of the attitude control chip 102 in the imitated firefly unit 100 can be welded or inserted into the corresponding socket of the PCB board 101, and each LED light in the LED light group 103 can also be welded to the PCB board 101, and the LED lights correspond to the pins of the attitude control chip 102 one by one. The attitude control chip 102 in each imitated firefly unit 100 can control the on and off, light intensity, breathing frequency, breathing movement distance and/or movement speed of each LED light in the corresponding LED light group 103 according to the built-in program to achieve visual effects of fireflies flying freely and dynamically, the fireflies breathing and flashing while in staying state, and the information transmission between the fireflies.

FIGS. 1 to 4, the method for controlling the flying firefly lamp linearly distributed provided in the present application will be exemplarily described.

Assuming that the flying firefly lamp linearly distributed includes a plurality of imitated firefly units 100, for each imitated firefly unit 100, the attitude control chip 102 is an MCU provided with EEPROM, and the program is stored in the EEPROM, the attitude control chip 102 can control the on and off, light intensity, breathing frequency, breathing movement distance and/or movement speed of each LED light in the corresponding LED light group 103 according to the built-in program to achieve visual effects of fireflies flying freely and dynamically, the fireflies breathing and flashing while in staying state, and the information transmission between the fireflies. In addition, the corresponding series number can be input into the MCU through the address input pin of the MCU and stored in the EEPROM. Each imitated firefly unit 100 can simulate the different flying states of a firefly.

After the system is initialized, for each imitated firefly unit 100, the internal program of the attitude control chip 102 is started, and the attitude control chip 102 obtains the series number corresponding to the imitated firefly unit 100 from the EEPROM. After the timer in the attitude control chip 102 is turned on, according to the preset time-scale in the program, when the series number to be activated or closed for the timing point in the time-scale is the same as the series number stored in the attitude control chip 102, the attitude control chip 102 controls the state of the corresponding LED light group 103 according to the flying mode preset in the program. The attitude control chip 102 can control the light and dark state, breathing frequency (that is, the frequency of the LED light flashing), breathing movement distance and/or movement speed of each LED light in the corresponding LED light group 103 through the PWM signal, so that the LED light group 103 can simulate the dynamic flying state of a firefly in the air.

In addition, the attitude control chip 102 can control the corresponding LED light group 103 to simulate different flying modes of fireflies in a certain sequence. After the preset time period, the timer starts from the initial time point, and the attitude control chip 102 again controls the corresponding LED light group 103 to simulate the different flying modes of fireflies in a certain sequence. The flying firefly lamp linearly distributed provided in the present application can present the visual effects of fireflies in different flying modes according to a certain rule, and can also simulate the visual effect of flashing when the fireflies in the staying state, which improves the diversity of the firefly lamps.

References described in the present application to "an embodiment" or "some embodiments", etc. mean that one or more embodiments of the present application include specific features, structures, or characteristics described in combination with the embodiment. Therefore, the phrases "in one embodiment", "in some embodiments", "in some other embodiments", "in some further embodiments", etc. appearing in different places in the description are not necessarily all refer to the same embodiment, but mean "one or more but not all embodiments" unless otherwise specifically emphasized in other ways. The terms "including", "comprising", "having" and their variations all mean "including but not limited to", unless otherwise specifically emphasized.

In the description of the present application, it should be understood that the terms "first" and "second" are only used for description purposes, and cannot be understood as indicating or implying relative importance or implicitly indicating the number of the indicated technical features. Therefore, the features defined with "first" and "second" may explicitly or implicitly include at least one of the features. In addition, the term "and/or" used in the description of the present application and the appended claims refers to any combination of one or more of the associated listed items and all possible combinations, and includes these combinations.

In addition, in the description of the present application, it should be understood that the terms "longitudinal", "horizontal", "upper", "lower", "front", "rear", "left", "right", and "vertical" "," "horizontal", "top", "bottom", "inner", "outer", "axial", "radial", "circumferential" and other directions or positional relationships are based on the drawings shown the orientation or positional relationship is only for the convenience of describing the present application and simplifying the description, rather than indicating or implying that the device or element referred to must have a specific orientation, be constructed and operated in a specific orientation, and therefore cannot be understood as a limitation of the present application.

In addition, in the present application, unless expressly stipulated and limited otherwise, the terms "connecting", "connected", etc. should be understood in a broad sense. For example, it can be a mechanical connection or an electrical connection; it can be a direct connection or an indirectly connected through an intermediary, which can be the internal communication between two elements or the interaction between two elements. Unless otherwise clearly defined, those skilled in the art can understand the specific meaning of the above terms in the present application according to specific circumstances.

Finally, it should be noted that the above embodiments are only used to illustrate the technical solutions of the present application, rather than for limiting; although the present application has been described in detail with reference to the foregoing embodiments, those skilled in the art should understand that: the technical solutions described in the foregoing embodiments can still be modified, or some or all of the technical features can be equivalently replaced; and these modifications or replacements do not make the essence of the corresponding technical solutions deviate from the scope of the technical solutions of the embodiments of the present application.

What is claimed is:

1. A flying firefly lamp linearly distributed, comprising:

at least one imitated firefly unit (100); and a power cord (200), comprising a positive power cord (201) and a negative power cord (202);

wherein the at least one imitated firefly unit (100) is sequentially connected in parallel between the positive power cord (201) and the negative power cord (202); and each imitated firefly unit (100) comprises a PCB board (101), the PCB board (101) is provided with an attitude control chip (102) and a plurality of LED lights (1031) arranged in an arrangement, after the attitude control chip (102) is energized by the power cord (200), the attitude control chip (102) controls the plurality of LED lights (1031) to flash in sequence according to a preset flying mode.

2. The flying firefly lamp linearly distributed according to claim 1, wherein the attitude control chip (102) is an MCU, and the MCU is stored with serial number of each imitated firefly unit (100) and a time-scale configured for controlling each imitated firefly unit (100) to flash according to the flying mode.

3. The flying firefly lamp linearly distributed according to claim 1, wherein the PCB board (101) is further provided with a current-limiting resistor (104), and one end of the current-limiting resistor (104) is respectively connected to the positive power cord (201) and the attitude control chip (102), and the other end is respectively connected to the plurality of LED lights (1031).

4. The flying firefly lamp linearly distributed according to claim 1, wherein the flying firefly lamp further comprises: an invisible bracket and a lampshade;

each imitated firefly unit (100) and the power cord (200) are arranged on the invisible bracket, the invisible bracket is arranged in the lampshade, the lampshade is provided with a plurality of through holes, and inside of the lampshade is plated with a matte coating, and an outer surface of the power cord (200) is provided with a matte sheath;

a color of the matte coating, a color of the PCB board (101), and a color of the outer surface of the invisible bracket are the same as a color of the matte sheath, and light emitted by the plurality of LED lights (1031) are emitted through the through holes.

5. The flying firefly lamp linearly distributed according to claim 4, wherein the color of the matte coating, the color of the PCB board (101), the color of the outer surface of the invisible bracket, and the color of the matte sheath are black.

6. The flying firefly lamp linearly distributed according to claim 4, wherein the invisible bracket is a spring.

7. The flying firefly lamp linearly distributed according to claim 1, wherein a shape of the PCB board (101) is in a leaf shape, and a color of the PCB board (101) is the same as a color of a leaf.

8. The flying firefly lamp linearly distributed according to claim 7, wherein a diameter of the power cord (200) is greater than 0 and less than or equal to 0.2 mm.

9. The flying firefly lamp linearly distributed according to claim 1, wherein the flying firefly lamp further comprises a power supply unit (300), and the power supply unit (300) is connected to each imitated firefly unit (100) through the power cord (200), and the power supply unit (300) is configured for powering the imitated firefly units (100).

10. The flying firefly lamp linearly distributed according to claim 9, wherein the power supply unit (300) is a solar power supply unit.

11. The flying firefly lamp linearly distributed according to claim 2, wherein the flying firefly lamp further comprises a power supply unit (300), and the power supply unit (300) is connected to each imitated firefly unit (100) through the power cord (200), and the power supply unit (300) is configured for powering the imitated firefly units (100).

12. The flying firefly lamp linearly distributed according to claim 3, wherein the flying firefly lamp further comprises a power supply unit (300), and the power supply unit (300) is connected to each imitated firefly unit (100) through the power cord (200), and the power supply unit (300) is configured for powering the imitated firefly units (100).

13. The flying firefly lamp linearly distributed according to claim 4, wherein the flying firefly lamp further comprises a power supply unit (300), and the power supply unit (300) is connected to each imitated firefly unit (100) through the power cord (200), and the power supply unit (300) is configured for powering the imitated firefly units (100).

14. The flying firefly lamp linearly distributed according to claim 5, wherein the flying firefly lamp further comprises a power supply unit (300), and the power supply unit (300) is connected to each imitated firefly unit (100) through the power cord (200), and the power supply unit (300) is configured for powering the imitated firefly units (100).

15. The flying firefly lamp linearly distributed according to claim 6, wherein the flying firefly lamp further comprises a power supply unit (300), and the power supply unit (300) is connected to each imitated firefly unit (100) through the power cord (200), and the power supply unit (300) is configured for powering the imitated firefly units (100).

16. The flying firefly lamp linearly distributed according to claim 7, wherein the flying firefly lamp further comprises a power supply unit (300), and the power supply unit (300) is connected to each imitated firefly unit (100) through the power cord (200), and the power supply unit (300) is configured for powering the imitated firefly units (100).

17. The flying firefly lamp linearly distributed according to claim 8, wherein the flying firefly lamp further comprises a power supply unit (300), and the power supply unit (300) is connected to each imitated firefly unit (100) through the power cord (200), and the power supply unit (300) is configured for powering the imitated firefly units (100).

* * * * *